(12) United States Patent
    Kuribayashi (10) Patent No.: US 10,073,372 B1
(45) Date of Patent: Sep. 11, 2018

(54) OPTICAL SCANNER AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yasushi Kuribayashi, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/455,445

(22) Filed: Mar. 10, 2017

(51) Int. Cl.
    | | |
    |---|---|
    | *G03G 15/043* | (2006.01) |
    | *H04N 1/193* | (2006.01) |
    | *H04N 1/29* | (2006.01) |
    | *H04N 1/028* | (2006.01) |
    | *G03G 15/01* | (2006.01) |
    | *G03G 15/04* | (2006.01) |
    | *G03G 15/16* | (2006.01) |

(52) U.S. Cl.
    CPC ........ *G03G 15/0435* (2013.01); *G03G 15/011* (2013.01); *G03G 15/0131* (2013.01); *G03G 15/0189* (2013.01); *G03G 15/04036* (2013.01); *G03G 15/1605* (2013.01); *H04N 1/02815* (2013.01); *H04N 1/1937* (2013.01); *H04N 1/29* (2013.01); *G03G 2215/0421* (2013.01); *H04N 2201/0081* (2013.01); *H04N 2201/0091* (2013.01)

(58) Field of Classification Search
    CPC ............ G03G 15/011; G03G 15/0189; G03G 15/0435; G03G 15/04036; G03G 15/1605; G03G 2215/0421; G03G 15/0131; H04N 1/1937; H04N 1/29; H04N 2201/0091; H04N 2201/0081; H04N 1/02815
    See application file for complete search history.

(56) References Cited

U.S. PATENT DOCUMENTS

| | | | |
|---|---|---|---|
| 7,236,281 B2 | 6/2007 | Hayashi et al. | |
| 8,587,626 B2* | 11/2013 | Komai | B41J 2/473 347/229 |
| 2002/0085082 A1* | 7/2002 | Takeuchi | H04N 1/053 347/129 |

* cited by examiner

*Primary Examiner* — Hoang Ngo
(74) *Attorney, Agent, or Firm* — Amin, Turocy & Watson LLP (57) ABSTRACT

An exposure unit comprises a polygon mirror configured to include a plurality of reflection surfaces; first to fourth light sources arranged at different angle positions along a rotation direction of the polygon mirror; two photo detectors configured to selectively detect first laser light and fourth laser light respectively at a scanning start end side of a main scanning direction among first to fourth laser light which are emitted from the respective light sources and reflected by the polygon mirror to be scanned in the main scanning direction; and a control section configured to control light emitting timing of the first to the fourth light sources on the basis of detection results of these photo detectors.

17 Claims, 7 Drawing Sheets

FIG.10 ically stably even though a polygon mirror having seven or more reflection surfaces is used in a tandem type image forming apparatus, and an image forming apparatus including the optical scanner.

OPTICAL SCANNER AND IMAGE FORMING APPARATUS

FIELD

Embodiments described herein relate generally to an optical scanner that deflects light from a light source in a main scanning direction to form an image on an image plane which moves in a sub-scanning direction, an image forming apparatus including the optical scanner, and methods associated therewith.

BACKGROUND

Conventionally, an image forming apparatus is known as a quadruple tandem type color copying machine in which four photoconductive drums are arranged in parallel in a horizontal direction. This kind of color copying machine is equipped with a single polygon mirror (optical scanner) which is arranged between the second photoconductive drum and the third photoconductive drum. Further, the color copying machine is equipped with four light sources for forming respective electrostatic latent images on the surfaces of the respective photoconductive drums. The four light sources are divided into left and right sides and arranged at the left and right sides two by two along a rotation direction of the polygon mirror, and separately eject laser light based on image signals of respective colors color-separated.

The laser light ejected from two light sources at the right side is reflected by the same reflection surface of the polygon mirror for scanning in a main scanning direction through the rotation of the polygon mirror, and is separately guided to two corresponding photoconductive drums at the right side. The laser light ejected from two light sources at the left side is reflected by another same reflection surface of the polygon mirror for scanning in a main scanning direction through the rotation of the polygon mirror, and is separately guided to two other corresponding photoconductive drums at the left side. Furthermore, the two light sources at the left side and the two light sources at the right side make pre-deflection optical systems independent, and thus are arranged at mutually different angles along the rotation direction of the polygon mirror.

Part of the laser light of each color after being deflected by the polygon mirror is detected by each of four photo detectors at an end part of a scanning start side in order to align writing timing of the latent images for the respective photoconductive drums by light beams of the respective color. Then, on the basis of the detection results of the four photo detectors, a control section of the image forming apparatus controls the writing timing of the laser light of each color.

However, as stated above, if two groups of light sources divided into left and right sides are arranged at different angle positions along the rotation direction of the polygon mirror, it is easy to generate a difference in light quantity obtained by detecting the laser light of each of left and right two systems that is reflected by the same reflection surface of the polygon mirror with the photo detector.

For example, attention is paid to one group of light sources arranged at the downstream side of the rotation direction of the polygon mirror. The laser light from one light source arranged at the upstream side along the rotation direction of the polygon mirror is vignetted by the reflection surface at the scanning start side on the same reflection surface more easily than the laser light from the other light source arranged at the downstream side. Further, the laser light from the light source at the downstream side along the rotation direction of the polygon mirror is vignetted by the reflection surface at a scanning end side on the same reflection surface more easily than the laser light from the light source arranged at the upstream side. Therefore, it is easy to generate a difference in the detected light quantity by the photo detector at the end part of the scanning start side on the reflection surface.

In order to control the writing timing of the laser light of each color with high accuracy, it is desired to uniformly align spot diameters and light quantity of the laser light detected by the photo detector. Therefore, in the conventional image forming apparatus described above, the width of each reflection surface of the polygon mirror becomes extremely large so that the laser light of each color entering the photo detector is not vignetted on the reflection surface at the scanning start end on the same reflection surface of the polygon mirror.

Conventionally, since a polygon mirror having six reflection surfaces is used in general, even if the width of each reflection surface is enlarged, the size of the polygon mirror can be confined in a specified size. However, in a case in which a polygon mirror having seven or more surfaces is adopted in order to achieve higher speeds, the size of the polygon mirror is larger than the specified size if the width of the surface is enlarged in the same way. In this case, the size of the apparatus is undesirably increased, inertia of the polygon mirror becomes large, time is necessarily spent until the rotation speed of the polygon mirror is stabilized, and as a result the first copy becomes slow.

DETAILED DESCRIPTION

Described herein is an optical scanner capable of simultaneously operating at high speeds and carrying out operation control with high accuracy without increasing the size of the constitution of the scanner and/or an image forming apparatus containing the scanner.

Hereinafter, an embodiment is described in detail with reference to the accompanying drawings.

Figure 1:
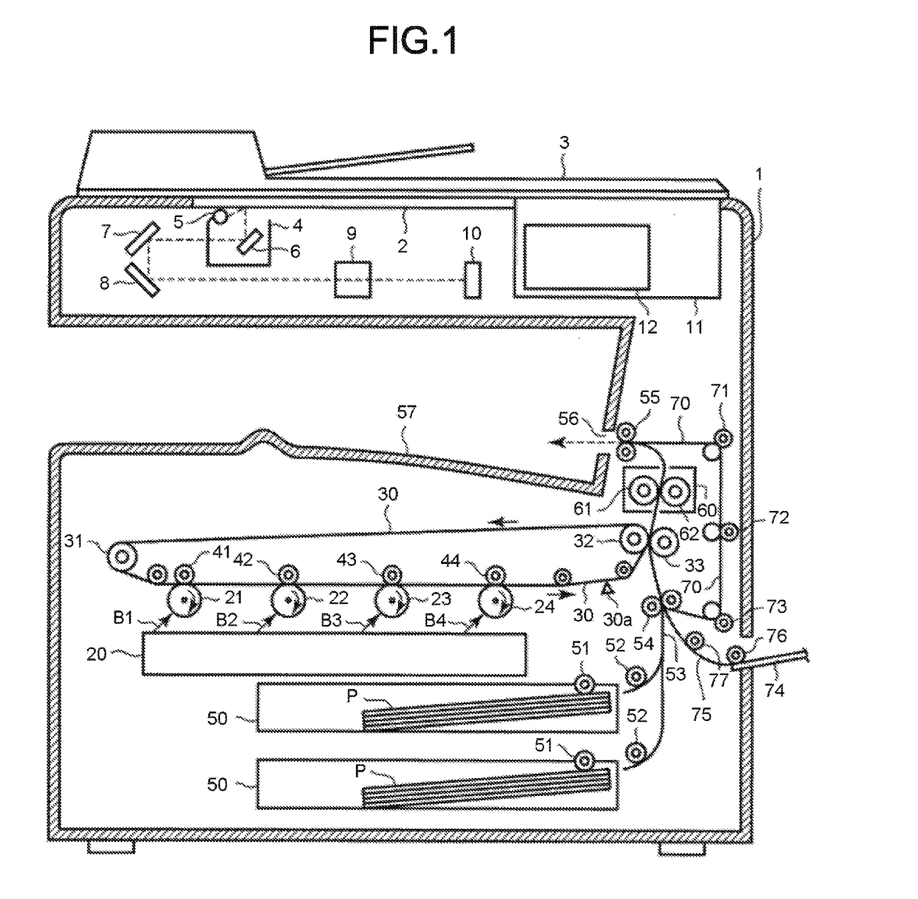
FIG. 1 is a schematic diagram illustrating an image forming apparatus according to an embodiment.

As shown in FIG. 1, a transparent document table (glass plate) 2 for document placement is arranged at the upper part of a main body 1, and a cover 3 is arranged on the document table 2 in an openable manner. A cartridge 4 is arranged at the lower side of the document table 2, and an exposure lamp 5 is arranged on the cartridge 4.

The cartridge 4 reciprocates along the lower surface of the document table 2. The exposure lamp 5 exposures a document on the document table 2 with the reciprocation of the cartridge 4. A CCD (Charge Coupled Device) 10 receives a reflected light image generated by the exposure via reflection mirrors 6, 7 and 8 and a lens block for variable power 9. The CCD 10 outputs an image signal at a level corresponding to the reflected light image from the document.

A control panel 11 for operation condition setting is arranged nearby the document table 2. The control panel 11 includes a touch panel type liquid crystal display section 12.

An exposure unit 20 (optical scanner) receives the image signal output by the CCD 10. The exposure unit 20 color-separates the image signal received from the CCD 10 into each color component. The exposure unit 20 respectively emits laser light B1 corresponding to a color-separated yellow image signal, laser light B2 corresponding to a color-separated magenta image signal, laser light B3 corresponding to a color-separated cyan image signal, laser light B4 corresponding to a color-separated black image signal to a photoconductive drum 21 serving as an image carrier for yellow, a photoconductive drum 22 serving as an image carrier for magenta, a photoconductive drum 23 serving as an image carrier for cyan and a photoconductive drum 24 serving as an image carrier for black.

The photoconductive drums 21, 22, 23 and 24 are arranged in this order from left to right in FIG. 1 in the almost horizontal direction at fixed intervals. An intermediate transfer belt 30 is arranged at the upper part of these photoconductive drums 21, 22, 23 and 24. The intermediate transfer belt 30 is stretched over a drive roller 31 and a driven roller 32. The intermediate transfer belt 30 receives motive power from the drive roller 31 to be rotated in the counterclockwise direction.

Primary transfer rollers 41, 42, 43 and 44 are respectively arranged vertically movably at positions facing the photoconductive drums 21, 22, 23 and 24. The primary transfer rollers 41, 42, 43 and 44 are rotated while pushing the intermediate transfer belt 30 against peripheral surfaces of the photoconductive drums 21, 22, 23 and 24, and in this way, transfer images on the photoconductive drums 21, 22, 23 and 24 onto the intermediate transfer belt 30.

Registration sensors 30a and 30b for detecting resist patterns (not shown) of all the colors formed on the intermediate transfer belt 30 are arranged at the downstream side of the photoconductive drum 24 for black facing the intermediate transfer belt 30. In FIG. 1, only one registration sensor 30a is shown. The registration sensors 30a and 30b are arranged separated from each other in the width direction of the intermediate transfer belt 30. The registration sensors 30a and 30b may be arranged to detect the respectively corresponding resist patterns formed on the intermediate transfer belt 30 to detect various deviations of the image of each color.

Figure 2:
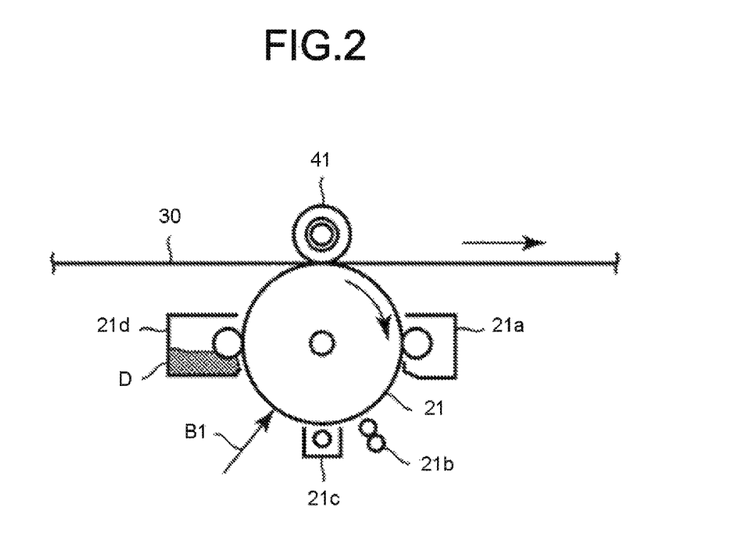
FIG. 2 is a schematic diagram illustrating the peripheral structure of a photoconductive drum of the image forming apparatus in FIG. 1.

The photoconductive drum 21 and the constitution of peripheral sections of the photoconductive drum 21 are illustrated in FIG. 2.

A cleaner 21a, a charge removing lamp 21b, a charging unit 21c and a developing unit 21d are arranged in order as developing modules around the photoconductive drum 21. The cleaner 21a removes a developing agent remaining on the surface of the photoconductive drum 21. The charge removing lamp 21b removes a charge remaining on the surface of the photoconductive drum 21. The charging unit 21c charges the surface of the photoconductive drum 21 with an electrostatic charge.

The surface of the photoconductive drum 21 charged by the charging unit 21c receives the laser light B1 emitted from the exposure unit 20. The laser light B1 forms an electrostatic latent image on the surface of the photoconductive drum 21. The developing unit 21d develops the electrostatic latent image on the surface of the photoconductive drum 21 by supplying a yellow developing agent D to the surface of the photoconductive drum 21.

The peripheral sections of the other photoconductive drums 22, 23 and 24 have the same constitution, and thus the descriptions thereof are omitted. Magenta, cyan, and black developing agents D are supplied to the photoconductive drums 22, 23, and 24, respectively.

A plurality of paper feed cassettes 50 are arranged below the exposure unit 20. These paper feed cassettes 50 store a plurality of papers P (media to be transferred) serving as image receiving media of which sizes are different from each other. Pickup rollers 51 and paper feed rollers 52 are arranged at positions corresponding to these paper feed cassettes 50. Each pickup roller 51 picks up papers P in each paper feed cassette 50 one by one. Each paper feed roller 52 supplies the paper P picked up by each pickup roller 51 to a conveyance path 53. The conveyance path 53 is extended to an upper paper discharge port 56 via includes a resist roller 54, the driven roller 32, a fixing unit 60 and a paper discharge roller 55. The paper discharge port 56 faces a paper discharge tray 57.

A secondary transfer roller 33 is arranged at a position facing the driven roller 32 across the intermediate transfer belt 30 and the conveyance path 53. The secondary transfer roller 33 transfers an image formed on the intermediate transfer belt 30 onto a sheet P fed from the resist roller 54. In other words, the secondary transfer roller 33 constitutes a transfer module together with the intermediate transfer belt 30, the drive roller 31, the driven roller 32 and the primary transfer rollers 41, 42, 43 and 44.

A conveyance path 70 that inverts front and back of a paper P and returns the paper P to the conveyance path 53 is arranged from the end of the conveyance path 53 to an upstream side position of the resist roller 54. The conveyance path 70 includes paper feed rollers 71, 72 and 73.

A manual feed tray 74 is detachably arranged on a side wall of the main body 1. A conveyance path 75 is arranged from the manual feed tray 74 to the upstream side position of the resist roller 54 in the conveyance path 53. A pickup roller 76 and a paper feed roller 77 are arranged at positions corresponding to the conveyance path 75. The pickup roller 76 picks up papers on the manual feed tray 74 one by one. The paper feed roller 77 supplies the paper picked up by the pickup roller 76 to the resist roller 54.

The fixing unit 60 includes a heat roller 61 and a pressure roller 62. The fixing unit 60 functions as a fixing module for heating the conveyed paper P at a temperature of, for example, 100 centigrade degrees with the heat roller 61 to fix the image transferred onto the paper P on the paper P.

Figure 3:
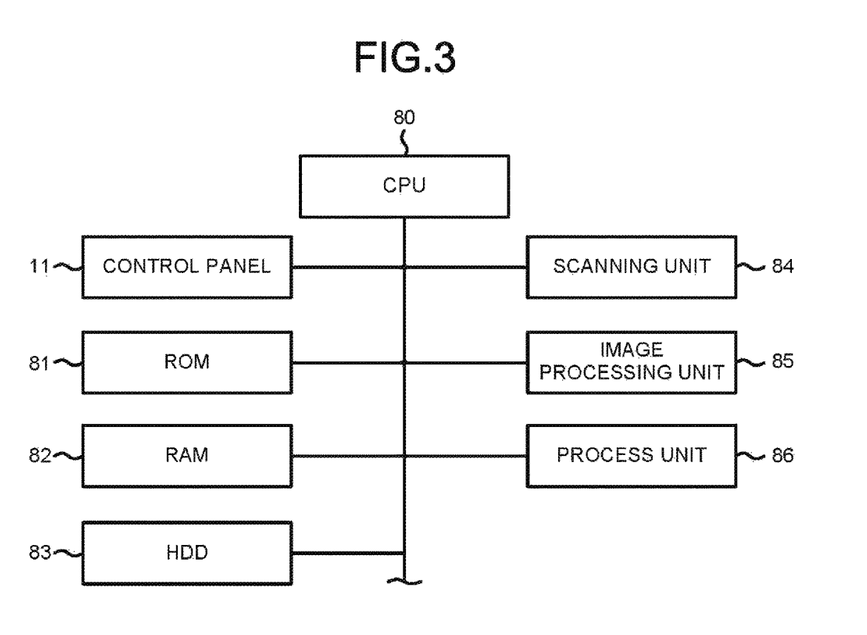
FIG. 3 is a block diagram illustrating a control system of the image forming apparatus in FIG. 1.

A control circuit of the main body 1 is illustrated in FIG. 3.

A CPU 80 of a computer is connected with the control panel 11, a ROM 81, RAM 82, a hard disk drive (HDD) 83, a scanning unit 84, an image processing unit 85 and a process unit 86. The CPU 80 functions as a control section that controls operations of the image forming apparatus of the present embodiment.

The control panel 11 includes a numeric keypad, a start key, a copy key for image forming mode setting and a scan key for image reading mode setting which are not shown, in addition to the touch panel type liquid crystal display section 12. The ROM 81 stores various programs for control. The RAM 82 stores various data. The hard disk drive 83 stores image data. The scanning unit 84, which includes the cartridge 4, the exposure lamp 5, the reflection mirrors 6, 7 and 8, the lens block for variable power 9 and the CCD 10, optically scans the image of the document on the document table 2 to read the scanned image. The image processing unit 85 suitably processes the read image of the scanning unit 84.

The process unit 86, which includes the exposure unit 20, the photoconductive drums 21, 22, 23 and 24, the constitution in FIG. 2 around each photoconductive drum, the intermediate transfer belt 30, the drive roller 31, the driven roller 32, the primary transfer rollers 41, 42, 43 and 44, the secondary transfer roller 33, the conveyance path 53, the fixing unit 60 and the conveyance path 70, forms the image processed by the image processing unit 85 on the paper P.

Figure 4:
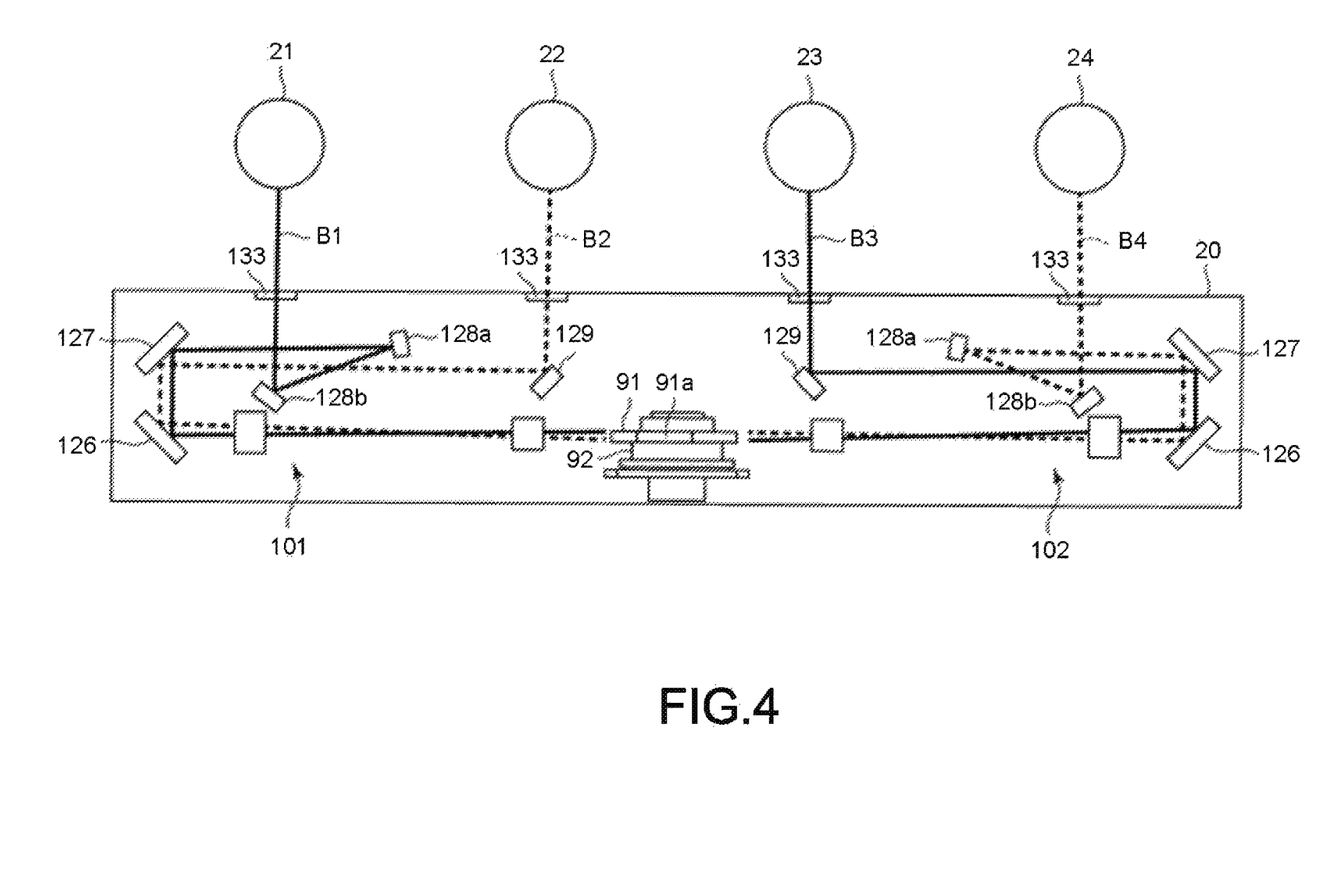
FIG. 4 is a schematic diagram illustrating the inner structure of an exposure unit of the image forming apparatus in FIG. 1.
Figure 5:
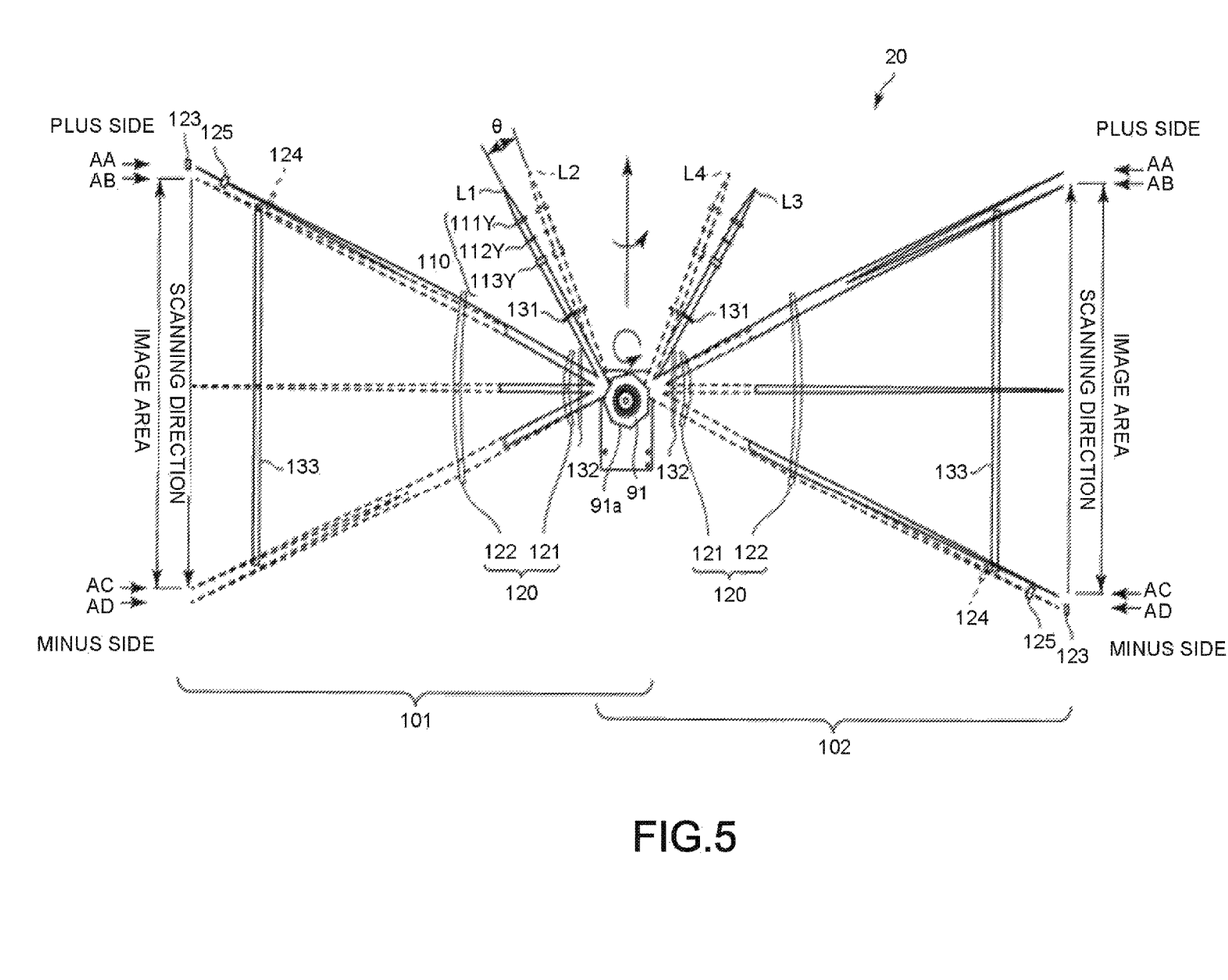
FIG. 5 is a ray diagram illustrating an optical system of the exposure unit in FIG. 4 expanded in a plane shape.

FIG. 4 is a schematic diagram illustrating the inner structure of the exposure unit 20. FIG. 5 is a ray diagram illustrating an optical system of the exposure unit 20 expanded in a plane shape along an optical path of laser light when viewed from the photoconductive drums 21, 22, 23 and 24 side. As shown in FIG. 1 and FIG. 4, the exposure unit 20 is arranged below the four photoconductive drums 21, 22, 23 and 24 to face the four photoconductive drums in a mutually separated manner.

The exposure unit 20 includes a polygon mirror main body 91 (hereinafter, referred to as a polygon mirror 91) in which, for example, seven plane reflection surfaces (plane reflection mirrors) are arranged in a regular polygon shape. In an embodiment, the polygon mirror main body 91 has at least seven plane reflection surfaces, such as 8 or 9 plane surfaces. The polygon mirror 91 includes a plurality of flat reflection surfaces 91a parallel to the rotational axis thereof. The plurality of the reflection surfaces 91a is arranged on the outer peripheral surface of the polygon mirror 91 continuously along a rotation direction of the polygon mirror 91. The polygon mirror 91 functions as an optical deflection member.

Further, the exposure unit 20 includes a motor 92 that rotates the polygon mirror 91 at a predetermined speed in a main scanning direction (in an arrow direction in FIG. 5). The motor 92 is arranged on the same axis as the polygon mirror 91. For example, the polygon mirror 91 is integrally mounted on the rotational axis of the motor 92.

The polygon mirror 91 is arranged between the second photoconductive drum 22 and the third photoconductive drum 23 from the left side as shown in the figure in a posture in which the rotational axis thereof is orthogonal to the rotational axis of each of the photoconductive drums 21, 22, 23 and 24. In other words, the photoconductive drum 21 for yellow and the photoconductive drum 22 for magenta are arranged at the left side of the polygon mirror 91, and the photoconductive drum 23 for cyan and the photoconductive drum 24 for black are arranged at the right side as shown in the figure.

In other words, the exposure unit 20 arranges two scanning optical systems 101 and 102 at both sides (left and right sides as shown in the figure) of the single polygon mirror 91 across the polygon mirror 91. The two scanning optical systems 101 and 102 have a symmetrical structure to a surface parallel to the rotation center of each of the photoconductive drums 21, 22, 23 and 24 including the rotational axis of the polygon mirror 91.

The scanning optical system 101 at the downstream side (at the left side as shown in the figure) along the rotation direction (counterclockwise direction) of the polygon mirror 91 reflects laser light B1 and laser light B2 emitted from light sources L1 and L2 with the same reflection surface 91a of the polygon mirror 91 to scan the laser light in the main scanning direction, and respectively guides the laser light B1 and the laser light B2 to the two photoconductive drums 21 and 22 at the left side as shown in the figure. Further, the scanning optical system 102 at the upstream side (at the right side as shown in the figure) along the rotation direction of the polygon mirror 91 reflects the laser light B3 and the laser light B4 emitted from light sources L3 and L4 with another same reflection surface 91a of the polygon mirror 91 to scan the laser light in the main scanning direction, and respectively guides the laser light B3 and the laser light B4 to the two photoconductive drums 23 and 24 at the right side as shown in the figure.

For example, the scanning optical system 101 at the left side as shown in the figure includes the light sources L1 and L2 (first and second light sources) that eject the laser light B1 and the laser light B2 (first and second beams of light) respectively towards the two photoconductive drums 21 and 22 at the left side as shown in the figure. The light sources L1 and L2 each are constituted by, for example, a laser diode, and respectively eject the laser light B1 corresponding to the color-separated yellow image signal and the laser light B2 corresponding to the color-separated magenta image signal.

The polygon mirror 91 reflects the laser light B1 and the laser light B2 emitted by the light sources L1 and L2 with the same reflection surface 91a (first reflection surface) and rotates to deflect (scan) the laser light towards an image plane arranged at a predetermined position, that is, towards the outer peripheral surfaces of the corresponding photoconductive drums 21 and 22 at a predetermined linear velocity. With the photoconductive drums 21 and 22 rotating in a sub-scanning direction, the electrostatic latent images corresponding to the image signals of the respective colors are formed on the outer peripheral surfaces of the photoconductive drums 21 and 22.

Figures 6A, 6B:
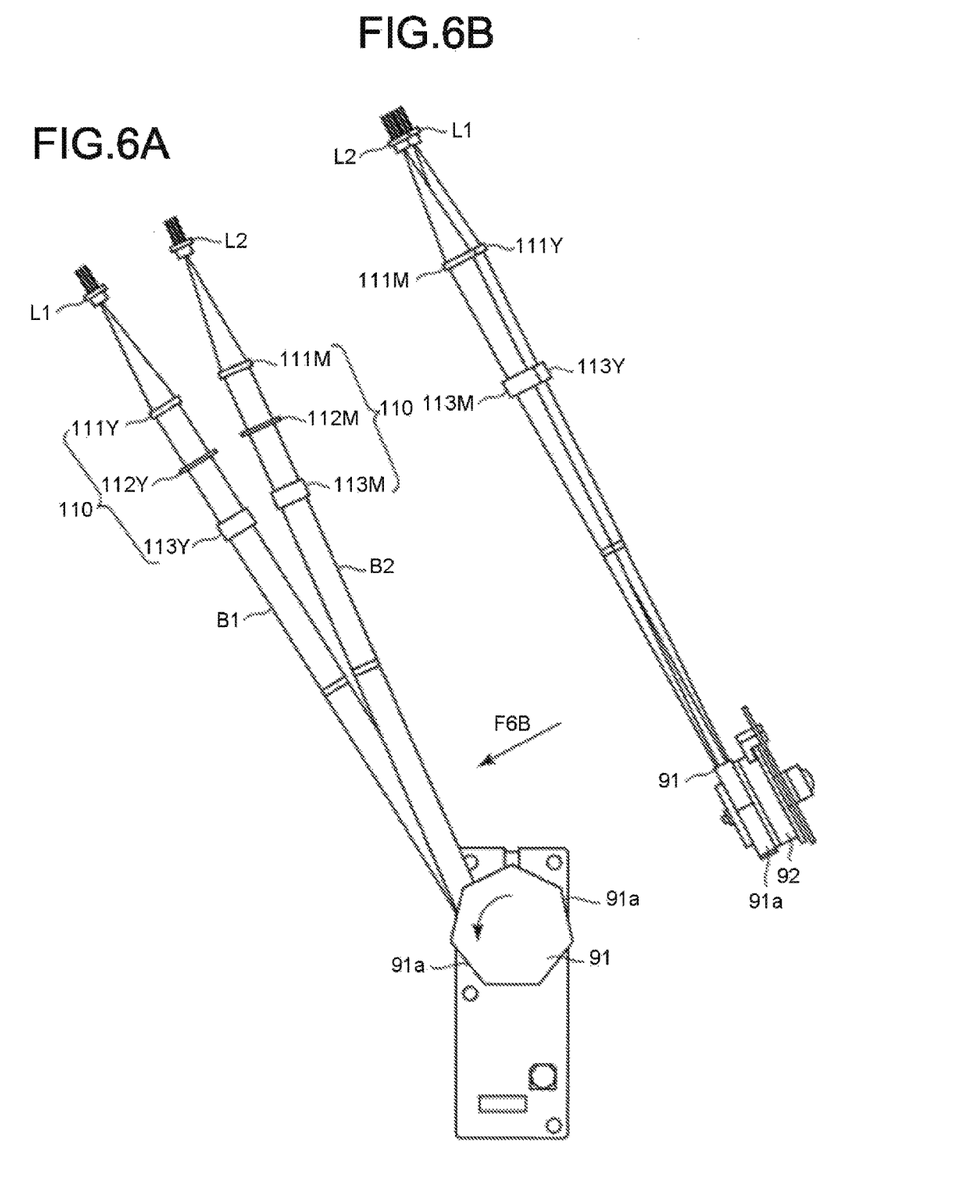
FIG. 6A is a partial enlarged view illustrating main portion in FIG. 5 enlarged partially.
FIG. 6B is a schematic diagram illustrating the structure in FIG. 6A when viewed from a shown arrow F6B direction.

The two light sources L1 and L2 of the scanning optical system 101 are arranged at different angle positions along the rotation direction of the polygon mirror 91 (along the arrow direction shown in the figure: counterclockwise direction) as shown in FIG. 6A. In other words, the light source L1 (yellow) between the two light sources is arranged at the downstream side along the rotation direction of the polygon mirror 91, and the light source L2 (magenta) is arranged at the upstream side along the rotation direction. Further, as shown in FIG. 6B, the two light sources L1 and L2 are arranged slightly shifted in a direction parallel to the rotational axis of the polygon mirror 91.

Pre-deflection optical systems 110 are arranged separately between each of the light sources L1 and L2 and the polygon mirror 91. The angle positions at which the two light sources L1 and L2 face the polygon mirror 91 are different, and thus the pre-deflection optical systems 110 independent on respective optical paths of the laser light B1 and the laser light B2 can be arranged.

Two groups of pre-deflection optical systems 110 separately corresponding to the light sources L1 and L2 respectively include finite focus lenses 111Y and 111M which apply predetermined convergences to the laser light B1 and the laser light B2 emitted by the light sources L1 and L2, diaphragms 112Y and 112M which apply predetermined cross-sectional beam shapes to the laser light B1 and the laser light B2 passing through the finite focus lenses 111Y and 111M, and cylinder lenses 113Y and 113M which apply predetermined convergences to the laser light B1 and the laser light B2 passing through the diaphragms 112Y and 112M with respect to the sub-scanning direction. The pre-deflection optical systems 110 align the cross-sectional beam shapes of the laser light B1 and the laser light B2 ejected from the light sources L1 and L2 to predetermined shapes, and guide the aligned shapes to the reflection surface 91a of the polygon mirror 91.

A post-deflection optical system 120 shown in FIG. 4 and FIG. 5 is arranged between the polygon mirror 91 and the image plane, that is, between the outer peripheral surfaces of the photoconductive drums 21 and 22. The post-deflection optical system 120 includes fθ lenses 121 and 122 serving as two groups of imaging lenses for optimizing shapes and positions on the image planes of the laser light B1 and the laser light B2 deflected (scanned) by the polygon mirror 91.

Further, the post-deflection optical system 120 includes a photo detector 123 for horizontal synchronization that detects part of the laser light B1 and the laser light B2 passing through the fθ lenses 121 and 122 at an end part (scanning position AA) of a scanning start side of the laser light B1 in order to align horizontal synchronization of the laser light B1 and the laser light B2. In FIG. 5, the laser light B1 is expanded in a plane shape and illustrated, and a reflecting mirror 124 for reflecting the laser light B1 towards the photo detector 123 is arranged on the optical path from the fθ lens 122 to the photo detector 123. Furthermore, an optical path correction element 125 for guiding the laser light B1 reflected towards the photo detector 123 by the reflecting mirror 124 onto a detection surface of the photo detector 123 is arranged between the reflecting mirror 124 and the photo detector 123.

Further, the post-deflection optical system 120 includes two reflecting mirrors 126 and 127 for collectively reflecting the laser light B1 and the laser light B2 of respective color components ejected from the fθ lenses 121 and 122 halfway as shown in FIG. 4. Furthermore, the post-deflection optical system 120 includes a plurality of reflecting mirrors 128a, 128b and 129 for guiding the laser light B1 and the laser light B2 reflected by the two reflecting mirrors 126 and 127 towards the corresponding photoconductive drums 21 and 22.

Further, first cover glasses 131 exist between the pre-deflection optical systems 110 and the polygon mirror 91, and a second cover glasses 132 exists between the polygon mirror 91 and the post-deflection optical system 120.

As a countermeasure for wind noise at the time the polygon mirror 91 is rotated, the first cover glass 131 functions as an inlet of the laser light, and the second cover glass 132 functions as an outlet thereof at the time the polygon mirror 91 is enclosed in a box.

Third cover glasses 133 exist between the reflecting mirrors 128a, 128b and 129 and the photoconductive drums 21 and 22, and function as outlets of the laser light from the housing of the scanning optical system.

On the other hand, the scanning optical system 102 at the right side as shown in the figure includes the light sources L3 and L4 (third and fourth light sources) for ejecting the laser light B3 and the laser light B4 (third and fourth beams of light) respectively towards the two photoconductive drums 23 and 24 at the right side as shown in the figure. The light sources L3 and L4 each are also constituted by, for example, a laser diode, and respectively eject the laser light B3 corresponding to the color-separated cyan image signal and the laser light B4 corresponding to the color-separated black image signal.

The polygon mirror 91 reflects the laser light B3 and the laser light B4 ejected by the light sources L3 and L4 with the same reflection surface 91a (second reflection surface: reflection surface different from the foregoing reflection surface for reflecting the laser light B1 and the laser light B2) and rotates to deflect (scan) the laser light towards an image plane arranged at a predetermined position, that is, towards the outer peripheral surfaces of the corresponding photoconductive drums 23 and 24 at a predetermined linear velocity. With the photoconductive drums 23 and 24 rotating in the sub-scanning direction, the electrostatic latent images corresponding to the image signals of the respective colors are formed on the outer peripheral surfaces of the photoconductive drums 23 and 24.

The two light sources L3 and L4 of the scanning optical system 102 are also arranged at different angle positions along the rotation direction of the polygon mirror 91, similar with the light sources L1 and L2 of the foregoing scanning optical system 101. In other words, the light source L3 (cyan) between the two light sources is arranged at the upstream side along the rotation direction of the polygon mirror 91, and the light source L4 (black) is arranged at the downstream side along the rotation direction. Further, the two light sources L3 and L4 are also arranged slightly shifted in the direction parallel to the rotational axis of the polygon mirror 91.

The pre-deflection optical systems 110 are arranged separately between each of the light sources L3 and L4 and the polygon mirror 91. Further, the post-deflection optical system 120 is arranged between the polygon mirror 91 and the image plane, that is, between the outer peripheral surfaces of the photoconductive drums 23 and 24. The pre-deflection optical systems 110 and the post-deflection optical system 120 have the same structures as the pre-deflection optical system 110 and the post-deflection optical system 120 of the foregoing scanning optical system 101, and are laid out symmetrically. Therefore, the descriptions of the pre-deflection optical systems 110 and the post-deflection optical system 120 of the scanning optical system 102 at the right side are omitted.

Furthermore, a direction in which each of the laser light B1, B2, B3 and B4 is deflected (scanned) by the polygon mirror 91 (rotational axis direction of each of the photoconductive drums 21, 22, 23 and 24) is defined as the "main scanning direction", and the rotational axis direction of the polygon mirror 91 serving as a deflector is defined as the "sub-scanning direction". Therefore, the main scanning direction is a direction vertical to each of the optical axis direction of each optical system and the rotational axis direction of the polygon mirror 91.

In the present embodiment, the scanning optical system 101 and the scanning optical system 102 are arranged at both right and left sides across the polygon mirror 91, and thus, in a case in which the polygon mirror 91 is rotated in a certain direction, the scanning direction of the photoconductive drums 21 and 22 by the scanning optical system 101 and the scanning direction of the photoconductive drums 23 and 24 by the scanning optical system 102 are reversed. Specifically, in a case in which the upper side in FIG. 5 is assumed to be a plus side and the lower side is assumed to be a minus side, the scanning optical system 101 at the left side as shown in the figure scans the image plane from the plus side to the minus side, and the scanning optical system 102 at the right side as shown in the figure scans the image plane from the minus side to the plus side.

In order to align writing timing in the main scanning direction of the laser light B1, B2, B3 and B4 in the scanning optical system 101 and the scanning optical system 102, it is necessary to separately arrange the photo detectors 123 for horizontal synchronization at the upstream sides of the main scanning directions of the scanning optical systems 101 and 102. Therefore, in the present embodiment, as shown in FIG. 5, the photo detector 123 (first photo detection section) for horizontal synchronization is arranged at the scanning position AA at the upstream side of the main scanning direction at the plus side of an image area in the scanning optical system 101, and the photo detector 123 (second photo detection section) for horizontal synchronization is arranged at a scanning position AD at the upstream side of the main scanning direction at the minus side of the image area in the scanning optical system 102.

Incidentally, in the present embodiment, as stated above, the four light sources L1, L2, L3 and L4 are arranged at the different angle positions along the rotation direction of the polygon mirror 91. In this way, the pre-deflection optical systems 110 are independently arranged corresponding to the laser light B1, B2, B3 and B4 of the respective colors. Therefore, in the present embodiment, the laser light B1 ejected from the light source L1 and the laser light B2 ejected from the light source L2 have an opening angle θ (FIG. 5) in the polarization rotation surface, and the laser light B3 ejected from the light source L3 and the laser light B4 ejected from the light source L4 have an opening angle θ in the polarization rotation surface.

Therefore, if attention is paid to for example, the scanning optical system 101 at the left side in FIG. 5, there is a possibility that at both ends of the main scanning direction, a difference is generated between reflected light quantity of the laser light B1 and the laser light B2 which are reflected by the same reflection surface 91a of the polygon mirror 91 to be scanned in the main scanning direction.

Figure 7:
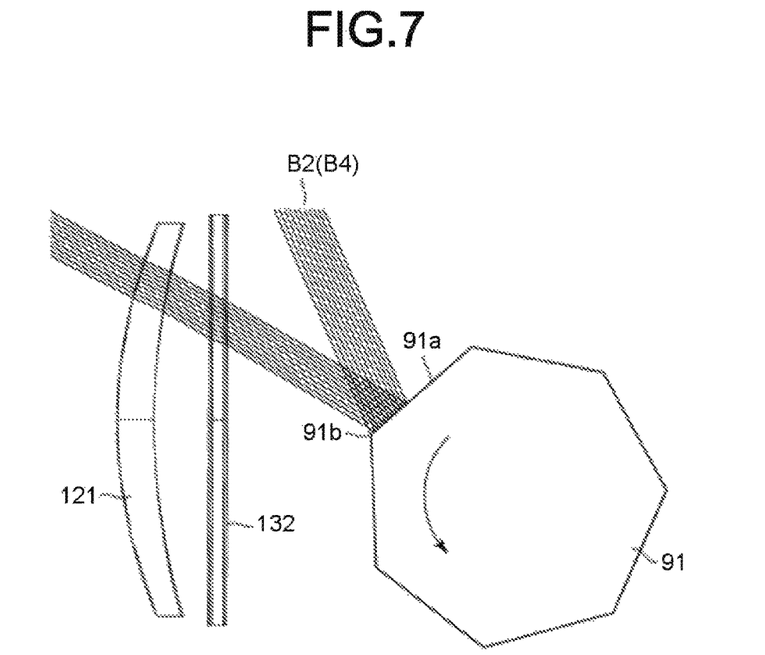
FIG. 7 is a schematic diagram illustrating a reflection state at a scanning start side of laser light B2 ejected from a light source L2 in FIG. 5.

In other words, at the scanning start side, as shown in FIG. 7, part of the laser light B2 ejected from the light source L2 is easy to vignette by an edge 91b at the downstream side of the reflection surface 91a, and the light quantity of the laser light B2 towards the photo detector 123 easily drops (in the following description, along the rotation direction of the polygon mirror 91, an edge at the downstream side on each reflection surface 91a is set as 91b, and an edge at the upstream side is set as 91c)

Figure 8:
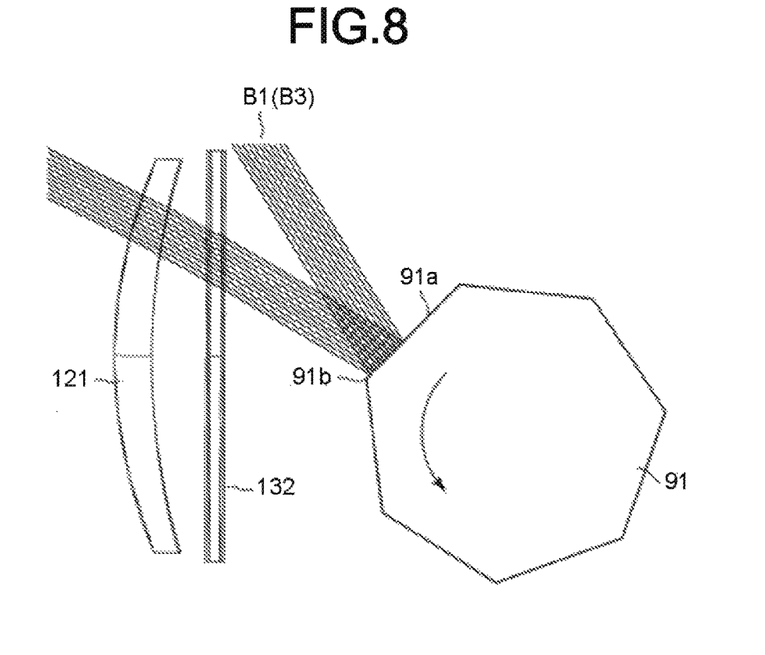
FIG. 8 is a schematic diagram illustrating a reflection state at a scanning start side of laser light B1 ejected from a light source L1 in FIG. 5.

On the contrary, as shown in FIG. 8, the laser light B1 reflected by the same reflection surface 91a enters the reflection surface 91a at the foregoing opening angle θ with respect to the laser light B2 in FIG. 7, and thus the laser light B1 is difficult to vignette by the same edge 91b of the reflection surface 91a and the light quantity of the light beam B to the scanning position AA at which the photo detector 123 is arranged is difficult to drop.

The difference of the light quantity at the scanning position AA caused by the foregoing opening angle θ becomes a difference of detected light quantity of the photo detector 123 without any changes, and in the present embodiment, only the laser light B1 from the light source L1 which is difficult to vignette by the reflection surface 91a is detected.

Figure 9:
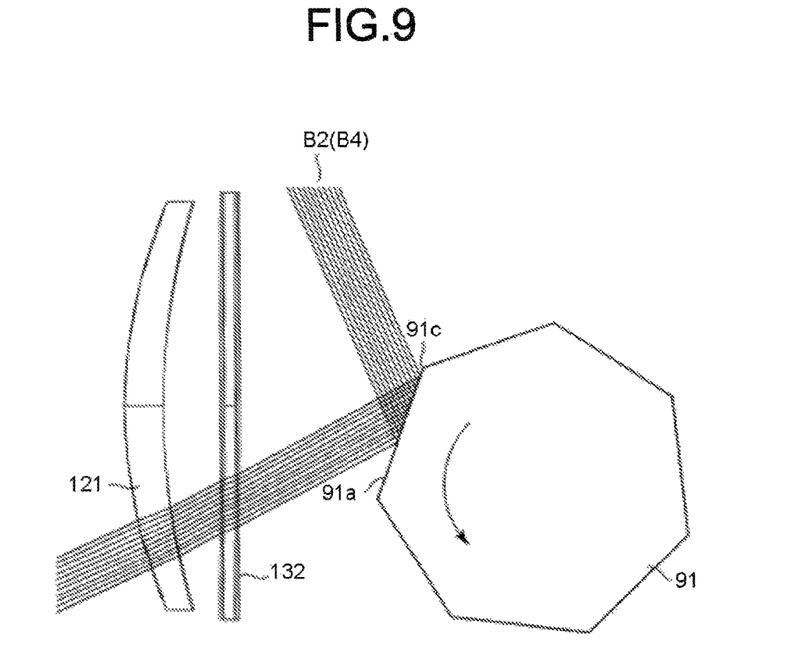
FIG. 9 is a schematic diagram illustrating a reflection state at a scanning end side of the laser light B2 ejected from the light source L2 in FIG. 5.
Figure 10:
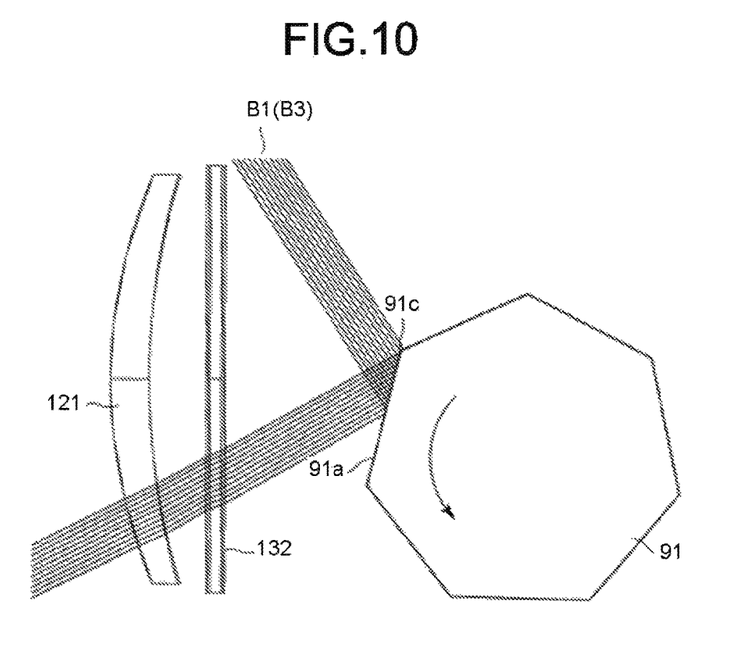
FIG. 10 is a schematic diagram illustrating a reflection state at a scanning end side of the laser light B1 ejected from the light source L1 in FIG. 5.

Conversely, at scanning end sides of the laser light B1 and the laser light B2, as shown in FIG. 9 and FIG. 10, part of the laser light B1 which is ejected from the light source L1 and reflected towards the scanning position AD by the reflection surface 91a is easy to vignette by the edge 91c at the upstream side at the opposite side to the reflection surface 91a, and the laser light B2 reflected towards the scanning position AD by the same reflection surface 91a is difficult to vignette by the edge 91c.

If the perspective is changed, in image areas AB-AC at the inner side with respect to the scanning position AA and the scanning position AD, the change of the light quantity of the laser light B1 and the laser light B2 emitted to the image plane can be suppressed, and an image having no shade unevenness can be formed.

Similarly, even in the scanning optical system 102, part of the laser light B3 and the laser light B4 to the scanning positions AA and AD at the outer side of the scanning direction of the image areas AB-AC is easy to vignette by the edges 91b and 91c of the reflection surface 91a of the polygon mirror 91. Therefore, in the present embodiment, between the laser light B3 and the laser light B4 to the scanning position AD at the end part of the scanning start side, only the laser light B4 which is difficult to vignette by the edge 91b of the reflection surface 91a of the polygon mirror 91 is detected by the other photo detector 123.

In this way, received light quantity of the laser light B1 and the laser light B4 detected by the two photo detectors 123 can become uniform, and horizontal synchronization alignment with high accuracy can be carried out between the two left and right scanning optical systems 101 and 102. Furthermore, the laser light B2 and the laser light B3 which are not detected by the photo detector 123 can be synchronized with the laser light B1 and the laser light B4 by detecting the resist patterns output to the intermediate transfer belt 30 with the foregoing registration sensors 30a and 30b.

On the contrary, for example, if the laser light B2 which is easy to vignette by the edge 91b of the polygon mirror 91 is detected by the photo detector 123 arranged at the scanning position AA, and the laser light B4 which is difficult to vignette by the edge 91b of the polygon mirror 91 is detected by the photo detector 123 arranged at the scanning position AD, the difference is generated in the light quantity of the beams of light entering the two photo detectors 123.

Similarly, even if the laser light B1 which is difficult to vignette by the edge 91b of the polygon mirror 91 is detected by the photo detector 123 arranged at the scanning position AA, and the laser light B3 which is easy to vignette by the edge 91b of the polygon mirror 91 is detected by the photo detector 123 arranged at the scanning position AD, the difference is generated in the light quantity of the beams of light entering the two photo detectors 123.

If it is assumed that the two photo detectors 123 have the same sensitivity, since the difference of the light quantity becomes a difference of detection time, it is not possible to carry out the horizontal synchronization alignment with high accuracy (relating to cost up in the case of matching the sensitivities).

Therefore, it is desired to detect the laser light B1 which is difficult to vignette by the edge 91b of the polygon mirror 91 with the photo detector 123 arranged at the scanning position AA and to detect the laser light B4 which is difficult to vignette by the edge 91b of the polygon mirror 91 with the other photo detector 123 arranged at the scanning position AD.

Herein, attention is paid to the laser light B1, B2, B3 and B4 of the respective colors, and irradiation light quantity in the image plane (at the scanning positions AA-AD) is respectively considered.

The laser light B1 ejected from the light source L1 can be scanned from the scanning position AA (photo detector 123) to the scanning position AC (minus end of the image area) via the scanning position AB (plus end of the image area) without being vignetted by the polygon mirror 91. Part of the laser light B1 is vignetted by the polygon mirror 91 from the scanning position AC to the scanning position AD; however, no problem occurs since this position is outside the image area.

Part of the laser light B2 ejected from the light source L2 is vignetted by the polygon mirror 91 from the scanning position AA (photo detector 123) to the scanning position AB (plus end of the image area), but since it is not necessary that the laser light B2 enters the photo detector 123 in the present embodiment, no problem occurs. On the other hand, the laser light B2 can be scanned from the scanning position AB (plus end of the image area) to the scanning position AC (minus end of the image area) without being vignetted by the polygon mirror 91. The laser light B2 from the scanning position AC to the scanning position AD is outside the image area; however, the laser light B2 is not vignetted by the polygon mirror 91.

The laser light B4 ejected from the light source L4 can be scanned from the scanning position AD (photo detector 123) to the scanning position AB (plus end of the image area) via the scanning position AC (minus end of the image area) without being vignetted by the polygon mirror 91. On the other hand, part of the laser light B4 is vignetted by the polygon mirror 91 from the scanning position AB to the scanning position AA; however, no problem occurs since this position is outside the image area.

Part of the laser light B3 ejected from the light source L3 is vignetted by the polygon mirror 91 from the scanning position AD (photo detector 123) to the scanning position AC (minus end of the image area), but since it is not necessary that the laser light B3 enters the photo detector 123 in the present embodiment, no problem occurs. On the other hand, the laser light B3 can be scanned from the scanning position AC (minus end of the image area) to the scanning position AB (plus end of the image area) without being vignetted by the polygon mirror 91. The laser light B3 from the scanning position AB to the scanning position AA is outside the image area; however, the laser light B3 is not vignetted by the polygon mirror 91.

As stated above, according to the present embodiment, none of the plurality of the laser light B1, B2, B3 and B4 are monitored, and only the laser light B1 and the laser light B4 emitted from the light sources L1 and L4 arranged at the angle positions difficult to perform vignetting with the edge 91b of each reflection surface 91a of the polygon mirror 91 are detected by the photo detectors 123. Therefore, the horizontal synchronization alignment with high accuracy can be carried out between the two left and right scanning optical systems 101 and 102.

On the contrary, it is also possible to arrange the optical system so that none of the laser lights B1, B2, B3 and B4 are vignetted by the edge 91b of each reflection surface 91a of the polygon mirror 91. In this case, for example, a method for widening the width in the rotation direction of each reflection surface 91a of the polygon mirror 91 is considered. However, if the width of each reflection surface 91a is enlarged while the number of the reflection surfaces 91a of the polygon mirror 91 is maintained, the outer diameter of the polygon mirror 91 is enlarged. On the other hand, in a case in which the outer diameter of the polygon mirror 91 is maintained, it is necessary to reduce the number of the reflection surfaces 91a, and neither is advantageous to achieving high speed.

In other words, according to the present embodiment, the outer diameter of the polygon mirror 91 is maintained, the number of the reflection surfaces 91a is maintained as well, and it is possible to achieve high speed of operations without increasing the size of the constitution of the apparatus. In addition, according to the present embodiment, the laser light deflected by the polygon mirror 91 can be monitored at uniform light quantity, and it is possible to carry out operation control with high accuracy.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An optical scanner, comprising:
    an optical deflection member configured to continuously include a plurality of flat reflection surfaces parallel to a rotational axis along a rotation direction;
    first and second light sources arranged facing the optical deflection member at different angle positions along the rotation direction of the optical deflection member;
    third and fourth light sources arranged facing the optical deflection member at different angle positions along the rotation direction at an opposite side to the first and second light sources across the optical deflection member;
    a first photo detection section configured to selectively detect part of a first beam of light at a scanning start end side of a main scanning direction from the first light source arranged at the downstream side of the rotation direction between first and second beams of light which are respectively emitted from the first and second light sources and reflected by a first reflection surface of the optical deflection member for scanning in the main scanning direction through rotation of the optical deflection member;
    a second photo detection section configured to selectively detect part of a fourth beam of light at a scanning start end side of a main scanning direction from the fourth light source arranged at the downstream side of the rotation direction between third and fourth beams of light which are respectively emitted from the third and fourth light sources and reflected by a second reflection surface different from the first reflection surface of the optical deflection member for scanning in the main scanning direction through the rotation of the optical deflection member; and
    a controller configured to control light emitting timing of the first to the fourth light sources on the basis of detection results of the first and second photo detection sections.

2. The optical scanner according to claim 1, wherein the optical deflection member comprises at least 7 flat reflection surfaces.

3. The optical scanner according to claim 1, wherein the optical deflection member comprises a polygon mirror.

4. An image forming apparatus, comprising:
an optical scanner according to claim 1 configured to guide the first to the fourth beams of light based on image signals to first to fourth image carriers through the rotation of the optical deflection member to form a latent image on the surface of each image carrier; and
an image forming section configured to develop the latent image to transfer the developed latent image onto a medium to be transferred.

5. The image forming apparatus according to claim 4, wherein the optical deflection member comprises at least 7 flat reflection surfaces.

6. The image forming apparatus according to claim 4, wherein the image forming apparatus is a color copy machine.

7. A method of simultaneously operating at high speeds and carrying out operation control with high accuracy without increasing a size of an image forming apparatus, comprising:
using the image forming apparatus according to claim 4.

8. A scanning method using the optical scanner of claim 1, comprising:
selectively detecting part of the first beam of light at a scanning start end side of the main scanning direction from the first light source arranged at the downstream side of the rotation direction between first and second beams of light which are respectively emitted from the first and second light sources and reflected by the first reflection surface of the optical deflection member for scanning in the main scanning direction through rotation of the optical deflection member;
selectively detecting part of the fourth beam of light at a scanning start end side of the main scanning direction from the fourth light source arranged at the downstream side of the rotation direction between third and fourth beams of light which are respectively emitted from the third and fourth light sources and reflected by the second reflection surface different from the first reflection surface of the optical deflection member for scanning in the main scanning direction through the rotation of the optical deflection member; and
controlling light emitting timing of the first to the fourth light sources on the basis of detection results of the first and second photo detection sections.

9. An optical scanner, comprising:
an optical deflection member comprising a plurality of reflection surfaces along a rotation direction;
first and second light sources arranged at different angle positions along the rotation direction of the optical deflection member;
third and fourth light sources arranged at different angle positions along the rotation direction at an opposite side to the first and second light sources across the optical deflection member;
a first photo detection section configured to selectively detect part of a first beam of light from the first light source arranged at the downstream side of the rotation direction between first and second beams of light which are respectively emitted from the first and second light sources and reflected by a first reflection surface of the optical deflection member to be scanned;
a second photo detection section configured to selectively detect part of a fourth beam of light from the fourth light source arranged at the downstream side of the rotation direction between third and fourth beams of light which are respectively emitted from the third and fourth light sources and reflected by a second reflection surface of the optical deflection member to be scanned; and
a controller configured to control light emitting timing of the first to the fourth light sources on the basis of detection results of the first and second photo detection sections.

10. The optical scanner according to claim 9, wherein the optical deflection member comprises at least 7 flat reflection surfaces.

11. The optical scanner according to claim 9, wherein the optical deflection member comprises a polygon mirror.

12. An image forming apparatus, comprising:
an optical scanner according to claim 9 configured to guide the first to the fourth beams of light based on image signals to first to fourth image carriers through the rotation of the optical deflection member to form a latent image on the surface of each image carrier;
a plurality of developing sections configured to develop the latent images of the respective image carriers;
a first transfer section configured to transfer a plurality of images developed by the plurality of the developing sections onto an intermediate transfer medium in an overlapped manner; and
a second transfer section configured to transfer the plurality of the images transferred onto the intermediate transfer medium onto a medium to be transferred.

13. The image forming apparatus according to claim 12, further comprising:
a pattern detection section configured to form latent images of resist patterns on the first to the fourth image carriers with the optical scanner, develop the latent images and detect a plurality of resist patterns transferred onto the intermediate transfer medium with the first transfer section; wherein
the controller is further configured to control light emitting timing of the first to the fourth light sources on the basis of a detection result of the pattern detection section in addition to detection results of the first and second photo detection sections.

14. The image forming apparatus according to claim 12, wherein the optical deflection member comprises at least 7 flat reflection surfaces.

15. The image forming apparatus according to claim 12, wherein the image forming apparatus is a color copy machine.

16. A method of simultaneously operating at high speeds and carrying out operation control with high accuracy without increasing a size of an image forming apparatus, comprising:
using the image forming apparatus according to claim 12.

17. A scanning method using the optical scanner of claim 9, comprising:
selectively detecting part of the first beam of light from the first light source arranged at the downstream side of the rotation direction between first and second beams of light which are respectively emitted from the first and second light sources and reflected by the first reflection surface of the optical deflection member to be scanned;
selectively detecting part of the fourth beam of light from the fourth light source arranged at the downstream side of the rotation direction between third and fourth beams of light which are respectively emitted from the third and fourth light sources and reflected by the second reflection surface of the optical deflection member to be scanned; and controlling light emitting timing of the first to the fourth light sources on the basis of detection results of the first and second photo detection sections.

* * * * *